Aug. 7, 1951    G. A. DAMON    2,563,160
FISH STRINGER
Filed Oct. 30, 1948
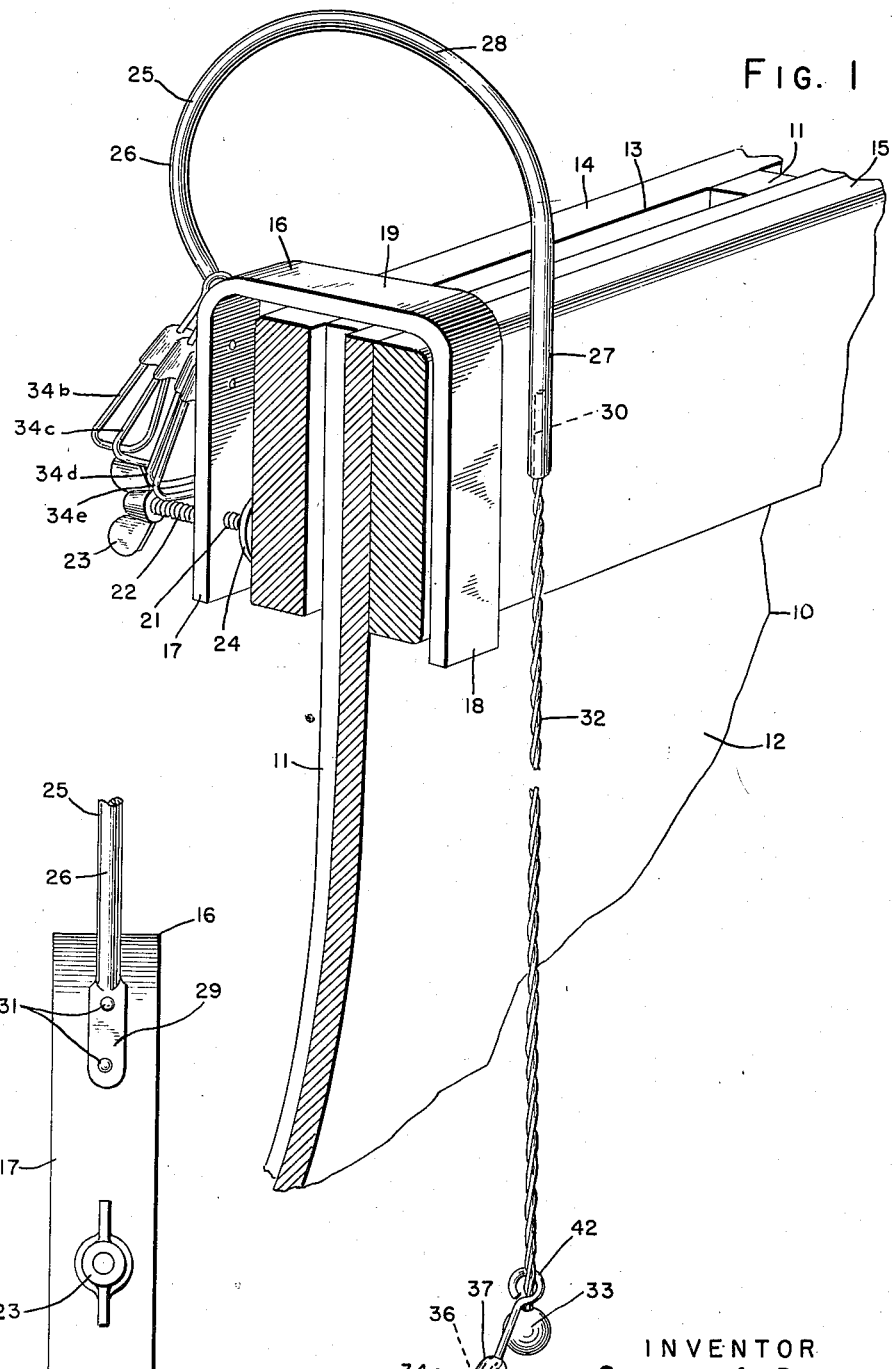
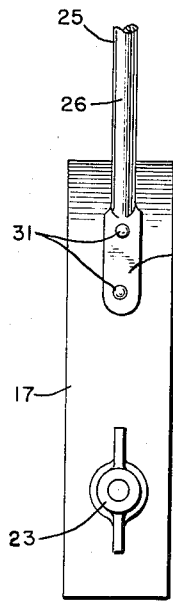
FIG. 1
FIG. 2
INVENTOR
GORDON A. DAMON
BY Caswell & Lagaard
ATTORNEYS Patented Aug. 7, 1951

2,563,160

UNITED STATES PATENT OFFICE 2,563,160

FISH STRINGER

Gordon A. Damon, Minneapolis, Minn.

Application October 30, 1948, Serial No. 57,477

6 Claims. (Cl. 224—7)

My invention relates to fish stringers and has for an object to provide a stringer by means of which the fish may be easily secured and placed in the water.

An object of the invention resides in providing a fish stringer by means of which the fish may be secured in place without lifting the fish previously caught out of the water.

A still further object of the invention resides in providing a fish stringer adapted to be secured to the gunwale of a boat.

Another object of the invention resides in providing a mounting for attachment to the boat and in further providing a guide of inverted U-shape having two vertical legs and a connecting portion therebetween with one of the legs attached to said mounting.

Another object of the invention resides in arranging the other leg of said guide spaced from the mounting and in securing thereto a tether adapted to extend down into the water.

A future of the invention resides in providing a plurality of fasteners slideable along said guide and tether, and to which the fish may be secured, said fasteners being normally stored upon the leg of said guide secured to the mounting.

Other objects of the invention reside in the novel combination and arrangement of parts, and in the details of construction hereafter illustrated and/or described.

In the drawings:

Fig. 1 is a perspective view of a portion of a boat illustrating an embodiment of my invention applied thereto.

Fig. 2 is an elevational view of a portion of the mounting and clamp of the invention.

In the handling of fish during fishing operations considerable inconvenience is encountered where the fish are strung on a single line. When a new fish is to be added to the string, either the line has to be detached from the boat with the danger of losing the fish, or the entire string has to be raised out of the water to permit adding the new fish to the fasteners secured to the line. The present invention provides a construction whereby the fasteners are conveniently maintained for ready access to the user, and by means of which the fish may be secured to the fasteners and then merely thrown overboard.

For the purpose of illustrating my invention I have shown in the drawings a portion of the hull of a boat 10. This boat comprises frames or ribs 11, and to which is attached the usual planking 12. At the upper edge of the planking is formed a gunwale 13, which consists of moldings 14 and 15 extending along the sheer of the boat and attached to the planking 12 and frames 11.

The invention proper consists of a mounting 16 which in the form of the invention disclosed is in the nature of a C-clamp. This clamp comprises spaced jaws 17 and 18 with a bar 19 connecting said jaws together. The clamps 16, if desired, may be constructed from a single strip of material bent into the form shown. The jaw 17 is threaded as indicated at 21 to receive a screw 22. Screw 22 has a wing head 23 by means of which the same may be rotated. The inner end of said screw has a pressure plate 24 swivelly attached to it, and which is adapted to engage the molding 14 to hold the clamp attached to the gunwale 13 when the mounting 16 is applied to the same.

The invention further includes a guide 25, which is preferably constructed of wire bent in the form of an inverted U. This guide has two vertical legs 26 and 27 with a connecting portion 28 therebetween. The leg 28 has a flattened portion 29 at the lower end of the same, which overlies the upper end of the jaw 17 of clamp 16, and which is secured thereto by means of rivets 31 or in any other suitable manner. The leg 26 is somewhat curved as illustrated in Fig. 1, and likewise the connecting portion 28 so that no abrupt bends or angles are formed in the said guide.

The lower end of the leg 27 of guide 25 has attached to it a tether 32. This tether is in the nature of a cable and is preferably formed of flexible wire rope. The upper end of said tether is inserted in a hole 30 drilled in the end of the leg 27 and soldered or brazed thereto. The tether 32 is of a length sufficient to reach well into the water when the stringer is attached to the gunwale of the ordinary boat. The lower end of the tether 32 has secured to it a stop 33. This stop may be in the form of a ball and may be constructed of readily fusible metal which may be cast on the end of the tether. If desired, however, the said stop may be of any other shape and may be pre-formed and secured to the tether by soldering, brazing or in any other manner.

In conjunction with the invention, I utilize a number of fasteners 34a, 34b, 34d, 34e, etc., which are identical in construction. Only the fasteners 34a will be described in detail. This fastener is in the nature of a safety pin, and is constructed from wire, being constructed with a shank 35 formed with an offset 36. A metal clip 37 constructed of sheet metal is bent about and secured to the shank 35 at the offset 36. The shank 35 is formed with a bend 38 and which terminates in a pin 39, preferably sharpened at the end. The wire from which the fastener is constructed is resilient, so that the pin 39 may be sprung toward the shank 35 to be received in a keeper 41 formed on the clip 37. The shank 35 extends outwardly beyond the clip 37 and is constructed at its end with an eye 42 through which the tether 32 and the guide 27 may extend.

In the use of the invention the clamp 16 is applied to the gunwale 13 of the boat, and the screw 22 tightened down to hold the same in position. All of the fasteners, 34a, etc., are threaded back along the guide 28 until they are received on the leg 26 of said guide. Fasteners 34b, 34c, and 34d are all shown in Figure 1 in position on said leg. When a fish is to be strung the uppermost fastener is utilized and the pin thereof disengaged from its keeper. The pin is then inserted through the proper part of the mouth of the fish and closed, and reinserted into the keeper. The fish and fastener may then be merely tossed overboard. During such movement the eye 42 follows along the curved portion of the leg 26 of guide 25, the connecting portion 28 thereof and downwardly along the leg 27 and tether 32. The first fastener then finds the position illustrated for fastener 34a in Fig. 1, its movement being terminated by the stop 33. When another fish is to be strung, the uppermost fastener which, with parts positioned as illustrated in Fig. 1, would be fastener 34b, is used in the same manner and the fish and fastener again tossed overboard.

While I have shown a limited number of fasteners used in conjunction with the stringer, it can readily be comprehended that any number of fasteners may be employed. Also where a certain type of fastener has been illustrated, it can be comprehended that other types of fasteners adapted to follow along the guide and tether of the invention may be used.

The advantages of the invention are manifest. The device is extremely simple in construction and can be constructed at a nominal expense. The fish are individually attached to the stringer, and the weight of the fish strung is not applied to the first fish on the stringer. The fish can be strung without detaching the stringer from the boat, or without raising the string of fish out of water. The use of the invention is simple and rapid, and the fish are positively secured to the tether. Where a given number of fasteners are employed the fisherman can always tell how many fish he has strung without counting the fish, this being accomplished by merely counting the remaining fasteners contained upon the guide of the stringer.

Changes in the specific form of my invention, as herein described, may be made within the scope of what is claimed without departing from the spirit of my invention.

Having described my invention, what I claim as new and desire to protect by Letters Patent is:

1. In a fish stringer, a mounting for attachment to a boat, a guide of inverted U-shape having two substantially vertical legs and a connecting portion therebetween, one of said legs being attached to said mounting and extending upwardly therefrom, the other of said legs being spaced from said mounting, a tether issuing from the end of said second leg, a stop on the end of said tether and a plurality of fasteners slidable along said guide and tether and normally positioned upon the first named leg of said guide.

2. In a fish stringer, a mounting for attachment to a boat, a guide of inverted U-shape having two substantially vertical legs and a connecting portion therebetween, one of said legs being attached to said mounting and extending upwardly therefrom, the other of said legs being spaced from said mounting, said first named leg and said connecting portion forming a continuous faired curve, a tether issuing from the end of said second leg, a stop on the end of said tether and a plurality of fasteners slidable along said guide and tether and normally positioned upon the first named leg of said guide.

3. In a fish stringer, a mounting for attachment to the upper portion of the hull of a boat, a guide of inverted U-shape having one leg issuing from the mounting inwardly of the hull with the connecting portion of the guide extending transversely of the hull and above the same and having the other leg spaced from the exterior of the hull, a tether issuing from the end of the second named leg, a stop on the end of the tether and a plurality of fasteners slidable along said guide and tether and normally positioned on said first named leg.

4. In a fish stringer a mounting for attachment to a boat, a plurality of fasteners, a guide attached to said mounting and on which the fasteners are slidably supported, said guide having a portion on which the fasteners may be normally supported when in disuse and another portion extending outwardly therefrom, a tether attached to said last named portion of the guide and a stop on the end of the tether, said fasteners being movable from said first named portion and along said second named portion and tether.

5. A fish holder comprising an inverted U-shaped clamp adapted to be mounted upon the gunwale of a boat, a member secured to the inside leg of said clamp at one end, the free end of said member being adapted to be suspended in the water outside of said boat, stop means on the free end of said member, and a plurality of fish fasteners slidably mounted on said member whereby said fasteners may be selectively disposed on said member in an inoperative position within said boat or moved toward the other end of said member to be retained thereon by said stop means.

6. A fish holder comprising clamp means adapted to be secured to a boat with a portion thereof disposed upon the interior of the boat adjacent the gunwale and below the upper edge of the gunwale, an elongated member secured at one end to said portion of the clamp means and extending partially upwardly along the gunwale and across the same, the free end of said member being adapted to be suspended in the water outside the boat, stop means on the free end of said member, and a plurality of fish fasteners slidably mounted on said member whereby said fasteners may be selectively disposed on said member in an inoperative position within said boat or moved toward the other end of said member to be retained thereon by said stop means.

GORDON A. DAMON.

REFERENCES CITED

The following references are of record in the file of this patent:

UNITED STATES PATENTS

| Number | Name | Date |
|---|---|---|
| 849,410 | Mills | Apr. 9, 1907 |
| 2,226,402 | Hirschmann | Dec. 24, 1940 |